SET-RESET INDICATOR AND VARIABLE DIGIT COUNTER AND INDICATOR

Filed Oct. 17, 1962

INVENTOR,
FRANCIS J. CERULLI
BY
Harry M. Saragovitz
ATTORNEY.

INVENTOR,
FRANCIS J. CERULLI
BY
Harry M. Saragovitz
ATTORNEY.

Dec. 7, 1965 F. J. CERULLI 3,222,503

SET-RESET INDICATOR AND VARIABLE DIGIT COUNTER AND INDICATOR

Filed Oct. 17, 1962 3 Sheets-Sheet 3

INVENTOR,
FRANCIS J. CERULLI

BY
Harry M. Saragovitz
ATTORNEY.

3,222,503

SET-RESET INDICATOR AND VARIABLE DIGIT COUNTER AND INDICATOR

Francis J. Cerulli, Berkeley Heights, N.J., assignor to the United States of America as represented by the Secretary of the Army Filed Oct. 17, 1962, Ser. No. 231,309
6 Claims. (Cl. 235—92)

This invention relates to electronic digital counting and indicating devices, in general, and more particularly to such devices which can perform a plurality of functions with only a minimum of change in the basic package.

The package to be described herein has three distinct applications. These are specifically: a set-reset indicator, a variable digit counter indicator and a variable digit counter. The set-reset indicator is used to accept, store and display information when commanded to do so. The variable digit counter indicator is a counter which will display its own progress. The variable digit counter will also count, but because of its decimal output it can be used in timing and other associated logic functions.

Presently marketed counter units are single function devices with none of the features for multiple function use which this device incorporates. The capability of changing from one counter configuration to another with only minor wiring changes presents an advantage over known circuits. Most of the wiring changes can be accomplished by switching while some of the changes in circuitry can be effected by substituting one plug-in unit for another. Of course, if the basic package were to be used in only one of the possible modifications, the changes could be made by manually resoldering the connections.

It is accordingly an object of this invention to provide a digital counter package which may be readily modified to perform a plurality of functions.

A further object of this invention is to provide a digital device for use in rapid data reduction especially where monitoring of the processed data is of value.

Another object of this invention is to provide a digital counter package which can function as a set-reset indicator, a variable digit counter indicator or a variable digit counter.

Figure 1A:
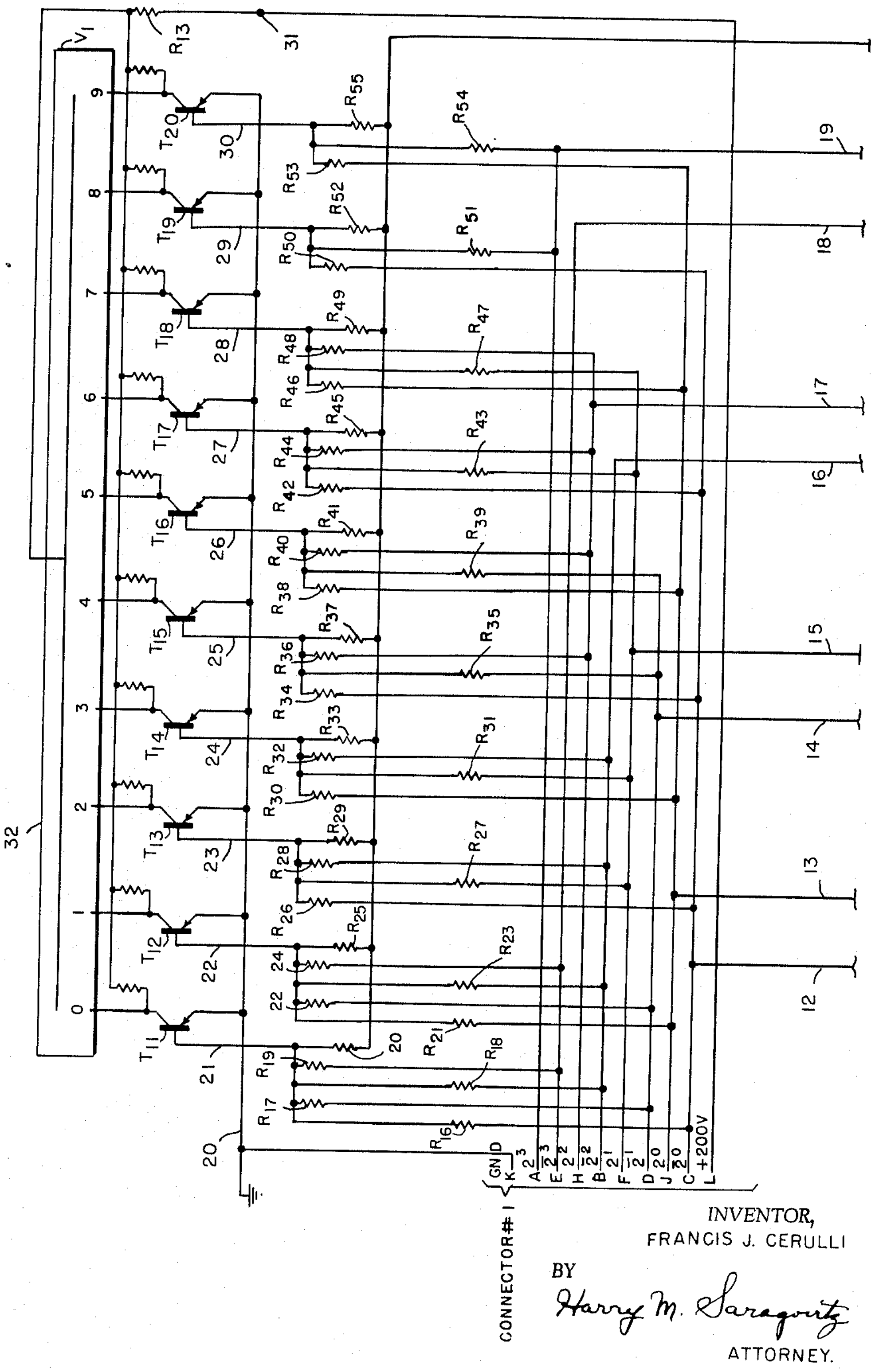
Figure 1B:
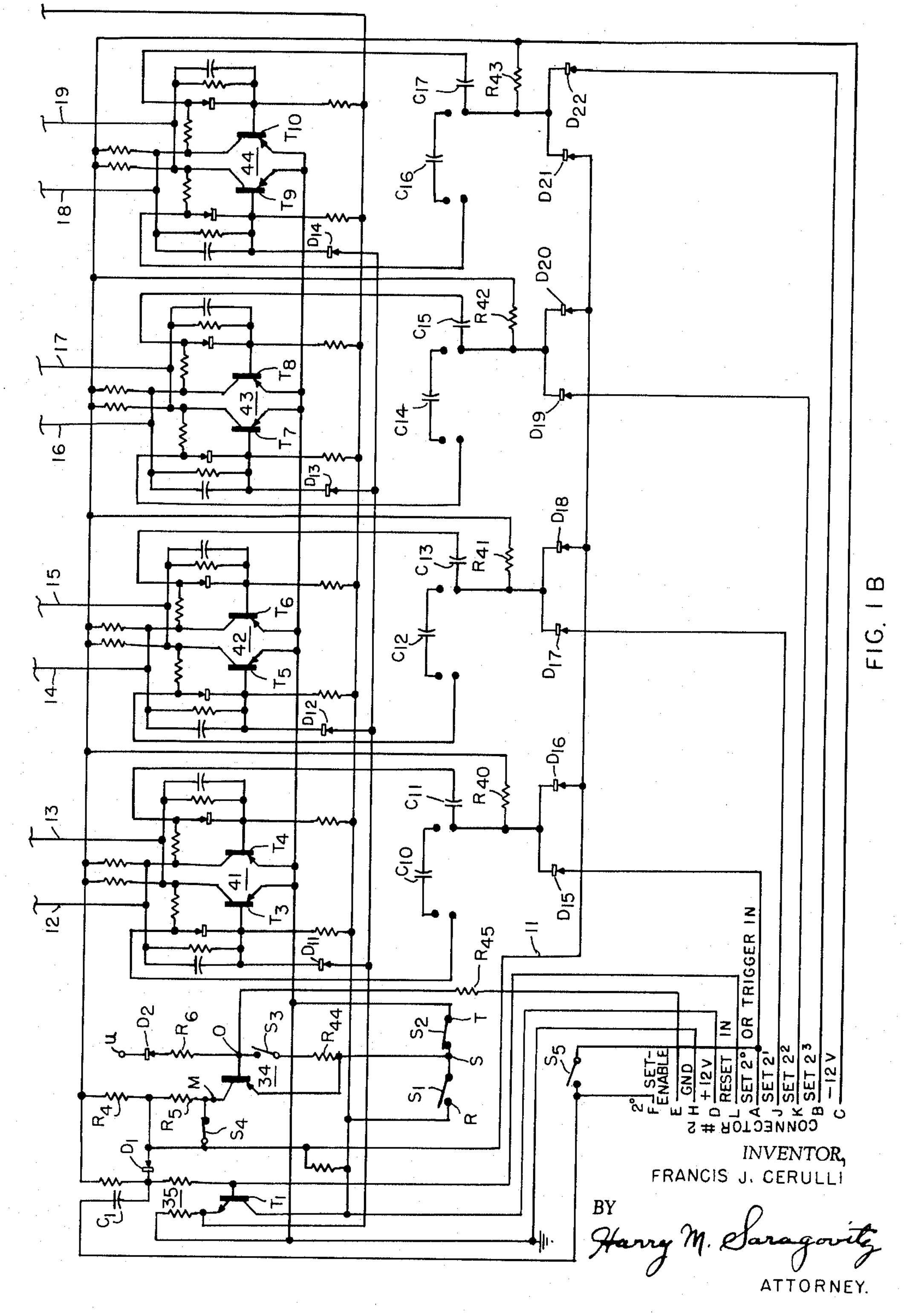
Figure 2:
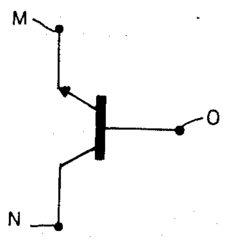
Figure 3:
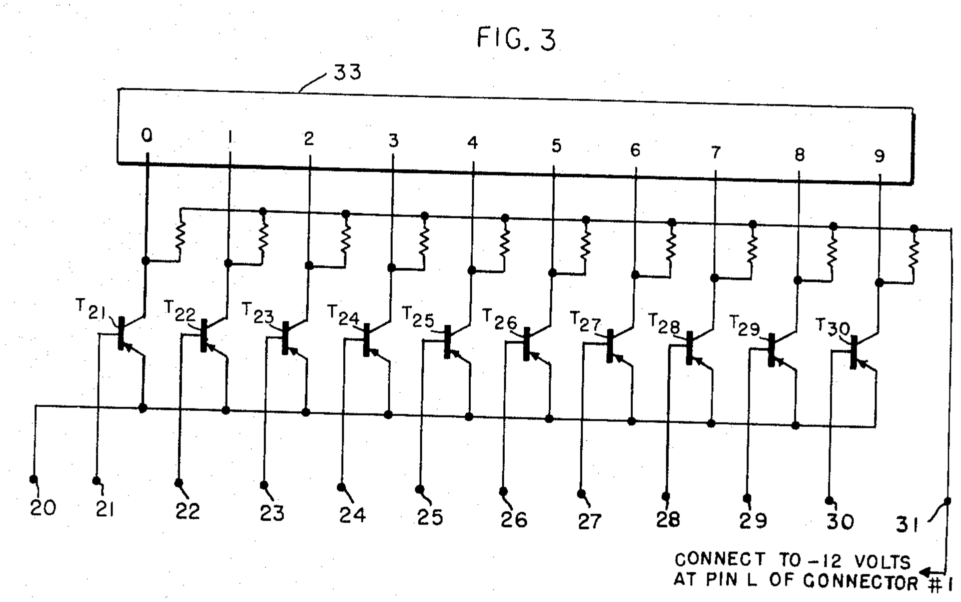

Other objects and advantages of this invention will be more readily comprehended upon consideration of the following detailed description of the invention taken in conjunction with the accompanying drawings wherein:

FIGS. 1A and B are a circuit diagram of the basic package of the multi-function digital equipment in accordance with the present invention, FIG. 2 is an NPN transistor which may be substituted for the PNP transistor $T_2$ in FIG. 1B, and FIG. 3 is a circuit diagram of the output drivers and socket which replace the output drivers and Nixie tube of FIG. 1A when the circuit is to be used as a variable digit counter.

Referring now to FIGS. 1A and B there is shown a four stage binary chain having flip-flops 41, 42, 43 and 44 comprising transistors $T_3$ and $T_4$, $T_5$ and $T_6$, $T_7$ and $T_8$ and $T_9$ and $T_{10}$, respectively, along with their associated circuitry. The input of each flip-flop is provided with an AND gate. The first flip-flop, which comprises transistors $T_3$ and $T_4$, has an input AND gate comprising diodes $D_{15}$ and $D_{16}$ and resistor $R_{40}$. The other three flip-flops have similar gates comprising diodes $D_{17}$ through $D_{22}$ and resistors $R_{41}$, $R_{42}$ and $R_{43}$. The outputs of these gates are A.C. coupled into the respective flip-flops through capacitors $C_{10}$ through $C_{17}$. Capacitors $C_{10}$, $C_{12}$, $C_{14}$ and $C_{16}$ can be switched in or out of the circuit depending on the desired operation. The AND gates have a common leg 11 which connects the output of transistor $T_2$ of an inhibit generator 34 to one of the inputs of each gate. The remaining inputs of the gates are connected to pins A, J, K and B respectively of connector 2. Pins C, D and H of this connector supply operating voltages to the transistors while pins E, F and L are pulse input terminals.

A reset generator 35 comprises a transistor $T_1$, the emitter of which is connected to the bases of transistors $T_3$, $T_5$, $T_7$ and $T_9$ through diodes $D_{11}$ through $D_{14}$. Switches $S_1$, $S_2$, $S_3$, $S_4$ and $S_5$ are used to insert or short out various circuit components depending upon the desired operation of the circuit. Capacitor $C_1$ and diode $D_1$ act as part of the reset generator circuitry when the package is used as a counter. Point U is connected to the base of transistor $T_2$ through a diode $D_2$ and a resistor $R_6$.

The outputs of the eight flip-flop transistors are connected through lines 12 to 19 to a resistor matrix comprising resistors $R_{16}$ through $R_{55}$. The matrix output voltages which appear at points 21 through 30 are connected to high votlage NPN transistors $T_{11}$ through $T_{20}$, which are connected to the cathodes of a Nixie tube $V_1$. The anode 32 of the Nixie tube is connected through resistor $R_{13}$ to a source of positive voltage at pin L of connector 1. Pin K of this connector is grounded and the remainder of the pins are connected to the outputs of each of the eight transistors of the binary chain.

The first configuration to be discussed will be the set-reset indicator, considering the following instructions with respect to modifying FIG. 1. Capacitors $C_{10}$, $C_{12}$, $C_{14}$ and $C_{16}$ are to be switched out of the circuit. Point S is connected to point T by closing switch $S_2$, switch $S_1$ remaining open. Point U remains unconnected. Resistor $R_{44}$ is omitted from the base biasing circuit of $T_2$ by opening switch $S_3$. Resistor $R_5$ is shorted by closing switch $S_4$. Transistor $T_2$ must be replaced by the NPN transistor shown in FIG. 2. It is to be noted that the transistor of FIG. 2 is connected to points M, N and O of FIG. 1 so that its emitter is connected to point M and its collector to point N. Thus the circuit has been changed from an inverting PNP amplifier operating between $\pm 12$ volts to an NPN emitter follower operating between ground and $-12$ volts.

The set-reset indicator will accept binary coded decimal (BCD) information, on four parallel lines, retain it in storage for as long as required, decode said information, and display the decimal information by means of a Nixie tube. FIG. 1 shows decoding of a 1–2–4–8 code; however, any binary code may be used.

Flip-flops 41 to 44 will trigger on a positive edge and are in saturated operation.

The logical levels for all inputs and outputs are as follows: a "0" is represented by 0 to $-2$ volts and a "1" is represented by $-7$ to $-12$ volts. Hence, to raise the common leg 11 of the input gates to the $-12$ volt condition, the set-enable input E of connector 2 must be brought to the "1" condition, i.e., a negative pulse between $-7$ and $-12$ volts is applied to the base of emitter follower $T_2$ causing a negative pulse to appear at common line 11. This will enable the flip-flops to accept the information available at the other leg of the input AND gates from terminals A, J, K and B of connector 2. It must be realized that the input to the gates must be a negative level for the period of time that the gates are turned on. The minimum time duration of this operation is 5 $\mu$sec. The flip-flops have now accepted information. At some later time when new information is available, a positive pulse of at least 5 $\mu$sec. duration applied to the input, called "reset in," will reset the flip-flops to the "0" state due to conduction of emitter follower $T_1$ of the reset generator. Immediately following reset new information may be accepted. The resetting of the flip-flops is accomplished by forcing the bases of the "0" transistors positive. In the set-reset indicator, configuration, the 2° input pin F of connector 2 is not used.

The resistive matrix accepts the flip-flop outputs by means of lines 12 to 19. The matrix output then controls a high voltage NPN transistor that activates one of the cathodes of the Nixie tube. Two basic facts are used to advantage in the circuit that allows operating Nixies from small signals. These being that the Nixie will operate at low pre-bias voltages and the uniqueness of the collector breakdown potential of certain NPN transistors. In essence, the matrix and the transistor act the same as any NOR logic element. Detection of all "0's" by any particular group of resistors in the overall matrix will turn on its particular transistor. This will increase the potential between the centered anode 32 and the particular cathode until the gas in the tube ionizes and the cathode glows. A glance at FIGURE 1 will show that the flip-flop outputs are made available at connector #1 for use in other control circuitry if needed.

The other configuration using the Nixie display is the variable digit counter indicator which uses the circuit of FIG. 1 modified as follows: $C_{10}$, $C_{12}$, $C_{14}$ and $C_{16}$ are switched into the circuit. Point R is connected to point S by closing switch $S_1$, switch $S_2$ being open. Switch $S_3$ is to be closed and switch $S_4$ opened. The set-enable connection at pin E of connector 2 cannot be more negative than 0 volts. Presetting the count is accomplished by moving point U of the inhibit generator to the output of one of the Nixie driving transistors $T_{11}$ to $T_{20}$. These outputs are conveniently located for this purpose in order that the change of count may be done in a minimum of time. $T_2$ is a PNP transistor as shown in FIG. 1.

The variable digit counter indicator will accept a serial pulse train and count the pulses, displaying on the Nixie tube the number of pulses having been counted. This unit will count to any number from 1 to 9 and then automatically re-set itself to zero after the next input pulse. The usefulness of this scheme can be seen, for example, on a 24-hour digital clock. The clock would consist of six packages that would display time as follows: 23 hours, 59 minutes, 59 seconds. Three of the units would be set for automatic reset at 9, 2 at 5, and 1 at 2. Hence, if the clock were reading 23, –59—59, the next input would reset the seconds and minute counters to zero. With the use of one NOR logic element reset of the least significant hours counter can be accomplished which would reset the most significant hours counter.

The four input capacitors $C_{10}$, $C_{12}$, $C_{14}$ and $C_{16}$ are added to make each flip-flop a triggered flip-flop or scale of two circuits. The serial pulse train to be countered is applied to the "set 2° or trigger in" input at pin A of connector 2, and a jumper is placed on the connector from pin A to pin F by closing siwtch $S_5$. Connecting B to A of the inhibit generator will hold the common leg of the input AND gates at $-12$ volts when $T_2$ is off and $+1$ volt when $T_2$ is on. Bringing the gate slightly positive by properly selecting the values of resistors $R_4$ and $R_5$ assures a solid clamp. The inhibit generator receives its input when point U is connected to one of the collector outputs of the Nixie drivers.

The first flip-flop receives its input in the form of a serial pulse train. The output of this flip-flop is inserted into the input of flip-flop 2 by taking the 2° side, pin C of connector 1 and connecting it to pin J of connector 2. The remaining flip-flops are connected accordingly.

Now, assuming the counter was preset to 9, i.e. point U is connected to the collector of transistor $T_{20}$, when the nine driver $T_{20}$ turns on, point U will drop sharply to ground. This will turn $T_2$ on and inhibit all input gates. Meanwhile, by virtue of $D_1$, the base of $T_1$ is pre-biased so that the next input pulse through $C_1$ will turn on $T_1$. This will reset the flip-flops to the zero state and put $T_2$ into the enable condition in order that the counter may accept pulses. The above approach is taken to insure that no commutating pulses will set flip-flops at any chosen reset position. The counter may still be reset at anytime by the application of a positive pulse at the reset input. The same is true of the inhibit generator.

The third configuration is also a counter, however, the individual decimal outputs are made available at an output connector as shown in FIG. 3. In FIG. 1 certain changes must be made for this configuration.

Point S is connected to point T by closing switch $S_2$, switch $S_1$ remaining open. Capacitors $C_{10}$, $C_{12}$, $C_{14}$ and $C_{16}$ are inserted into the circuit. Switches $S_3$ and $S_4$ are closed. Transistor $T_2$ is a PNP type connected in a common emitter configuration as shown in FIG. 1. Care must be taken to prevent grounding the case since the particular transistor used has its base connection tied to the external case for heat dissipation reasons. The accidental grounding of the case would damage the transistor.

The output stage shown in FIG. 3 is to be substituted for that of FIG. 1. The PNP output transistors 21 to 30 are inserted into FIG. 1 at points 20 to 31 in place of the NPN transistors. Pin L of connector 1 must be connected to $-12$ volts to provide the proper bias voltage for these transistors. A standard eleven pin tube socket 33 makes available the individual decimal outputs. The decimal outputs have logical levels of 0 and $-12$ volts making it compatible with the transistor circuitry used throughout the system. The theory of operation of the inhibit and reset generators is similar to that mentioned in the preceding section, but certain structural changes must be made for the following reasons: The output transistors $T_{11}$ to $T_{20}$ of the counter indicator are NPN with grounded emitters. Thus the outputs of these transistors swing between $+12$ volts and 0 volts. One of these transistors is chosen to drive point U of the inhibit generator. The inhibit generator being an NPN emitter follower has an output which swings from $-12$ volts to $+12$ volts. The tap between resistors $R_4$ and $R_5$, the emitter follower resistors, allows the bias of transistor $T_1$ to approach ground and not $+12$ volts.

When the package is used as a variable digit counter the functions of $T_1$ and $T_2$ remain the same with the exception of the voltage levels. Since the output transistors of this configuration are of the PNP type having output voltages varying from $-12$ to ground, $T_2$ voltages must be changed accordingly. Thus the emitter of transistor $T_2$ is grounded. Resistor $R_5$ must be shorted to allow the $R_4$–$R_5$ tap point to reach the $T_1$ bias level of nearly 0 volts. If $R_5$ were not shorted, the tap between resistors $R_4$ and $R_5$ would swing from $-12$ volts to $-6$ volts rather than from $-12$ volts to ground.

The invention thus comprises a basic circuit which can be readily modified so that three different functions can be performed. Operation could be changed by manually resoldering the connections or external switches could be used.

What is claimed is:

1. A multifunction binary circuit comprising a plurality of binary flip-flop stages each having an input AND gate; an inhibit generator transistor having an input terminal, an output terminal and a common terminal; means for supplying operating potentials of a reference potential, a voltage more negative than said reference potential and a voltage more positive than said reference potential; switch means connecting said common terminal to said positive potential of said reference potential; a first resistor and a first switch connected in series between said common terminal and said input terminal; a second resistor having one terminal connected to said output terminal; a third resistor connected between said negative potential and the terminal of said second resistor that is remote from said output terminal; a second switch connected in shunt with said second resistor; and means to connect the junction of said second and third resistors to each of said AND gates.

2. The binary circuit of claim 1 which further comprises resistor matrix means for converting binary signals to a decimal output; the outputs of said plurality of flip-flop stages being connected to said matrix; a plurality of output transistors having input and output terminals, the input terminals of said output transistors being connected to said matrix; the output terminal of one of said output transistors being connected to said inhibitor transistor input terminal; and output means connected to each of said output transistor output terminals.

3. The binary circuit of claim 2 in which said output means is a Nixie indicator.

4. The binary circuit of claim 2 in which said output means is an output connector.

5. A binary circuit comprising a plurality of binary flip-flop stages each having an input AND gate; an inhibit generator transistor having an input terminal and an output terminal; a reset generator transistor having an input terminal and an output terminal; biasing means connected to said reset transistor input terminal for holding the reset transistor in a normally non-conducting condition; a circuit input terminal connected to said biasing means and the AND gate of the first of said flip-flop stages; a diode connecting said inhibitor transistor output terminal to said biasing means; means connecting said reset transistor output to each of said flip-flop stages; means connecting said inhibit transistor output to each of said input AND gates; resistor matrix means for converting binary signals to a decimal output, the outputs of said plurality of flip-flop stages being connected to said matrix; a plurality of output transistors having input and output terminals, the input terminals of said output transistors being connected to said matrix, and the output terminal of one of said output transistors being connected to said inhibit transistor input transistor.

6. The binary circuit of claim 5 wherein said biasing circuit comprises two series connected resistors connected to said reset transistor input terminal, the junction between said resistors being connected to said diode and said circuit input terminal.

No references cited.

MALCOLM A. MORRISON, *Primary Examiner.*